H. & R. V. ROBIE.
Churn.
No. 22,090. Patented Nov. 16, 1858.
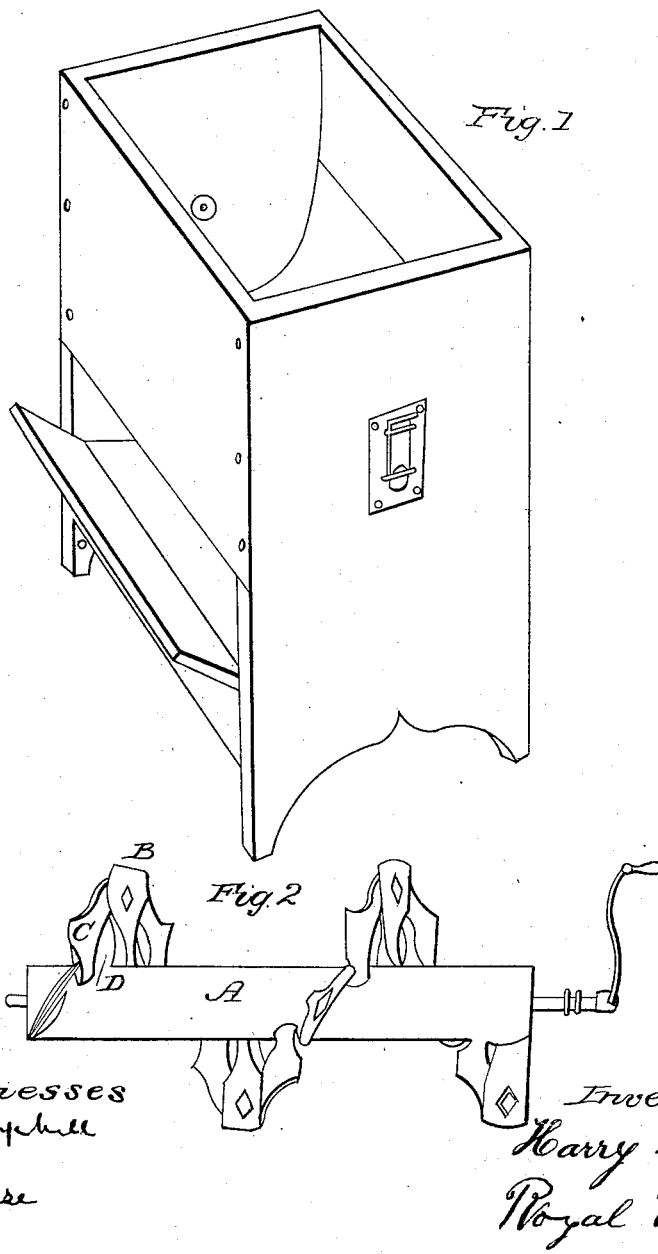

UNITED STATES PATENT OFFICE.

HARRY ROBIE AND ROYAL V. ROBIE, OF EATON, NEW YORK.

CHURN.

Specification of Letters Patent No. 22,090, dated November 16, 1858.

*To all whom it may concern:*

Be it known that we, HARRY ROBIE and ROYAL V. ROBIE, of Eaton, Madison county, State of New York, have invented a new and useful Improvement in Churns; and we do hereby declare that the following is a full and exact description thereof, reference being had to the accompanying drawings and to the letters of reference marked thereon.

The nature of our invention consists in constructing and placing on a horizontal shaft beaters of the following form and description, being placed spirally on the said horizontal shaft, each alternate beater being perforated with a diamond shaped hole, each of the other beaters not being perforated but having a concave extremity, the base of said beaters being made small and narrow where they enter the shaft in order to form an opening for the passage of the cream, between each of the beaters, while the holes in each alternate beater form another passage, also the ends of the remaining beaters being concave and the whole so placed on the shaft as to propel or force the cream from one end to the other of the box holding the same, thereby producing a violent agitation. Also in the side of and immediately under the box holding the cream is a space or chamber with a hinged door being the same length of the box holding the cream, and of sufficient capacity to secure and hold any cold or warm substance for the purpose of bringing the cream to a proper temperature.

To enable others to make and use our said invention we will proceed to describe its construction and operation.

We construct our said churn in the form and manner represented in the accompanying drawings, Figure 1 being a perspective view of the main body of the churn. Fig. 2 shows the shaft and beaters with crank attached.

A, Fig. 2, represents the horizontal shaft around which the beaters are placed spirally.

B represents the beater being perforated with the diamond hole each alternate beater having a like perforation.

C represents one of each of the remaining beaters having a concave extremity.

We are well aware that the beaters placed spirally around a horizontal shaft is an old and well known device. We do not claim therefore any of the parts separately or in the abstract, irrespective of the arrangement as shown and described, but

What we claim is—

The perforated beater B, in combination with the alternate beater C, presenting a concave extremity in connection with the passage formed by the narrow base of the beaters, the several parts being constructed and arranged upon the shaft A, with respect to each other in the manner and for the purposes set forth.

HARRY ROBIE.
ROYAL V. ROBIE.

Witnesses:
B. V. CAMPBELL,
A. W. MONO.